(12) United States Patent
Fujisawa et al.

(10) Patent No.: US 11,400,674 B2
(45) Date of Patent: Aug. 2, 2022

(54) SHEET MOLDING PRODUCTION METHOD

(71) Applicant: KURARAY CO., LTD., Okayama (JP)

(72) Inventors: Michinori Fujisawa, Okayama (JP);
Masato Warita, Okayama (JP);
Tatsuya Daimon, Ibaraki (JP)

(73) Assignee: KURARAY CO., LTD., Okayama (JP)

( * ) Notice: Subject to any disclaimer, the term of this patent is extended or adjusted under 35 U.S.C. 154(b) by 140 days.

(21) Appl. No.: 16/759,415

(22) PCT Filed: Nov. 2, 2018

(86) PCT No.: PCT/JP2018/040842
§ 371 (c)(1),
(2) Date: Apr. 27, 2020

(87) PCT Pub. No.: WO2019/098058
PCT Pub. Date: May 23, 2019

(65) Prior Publication Data
US 2020/0290300 A1      Sep. 17, 2020

(30) Foreign Application Priority Data

Nov. 17, 2017   (JP) ............................ JP2017-222143

(51) Int. Cl.
*B29C 51/10* (2006.01)
*B29D 35/12* (2010.01)
*B29C 70/42* (2006.01)

(52) U.S. Cl.
CPC ............ *B29D 35/126* (2013.01); *B29C 51/10* (2013.01); *B29C 70/42* (2013.01)

(58) Field of Classification Search
CPC ....... B29C 51/10; B29C 51/08; B29C 51/004; B29C 51/006; B29C 70/42; B29D 35/126
See application file for complete search history.

(56) References Cited

U.S. PATENT DOCUMENTS 2,666,935 A * 1/1954 Gilbert ................... A43D 11/12
12/64
3,029,449 A * 4/1962 Siron ..................... A43B 13/32
12/142 F
(Continued)

FOREIGN PATENT DOCUMENTS

GB          1341186 A    12/1973
JP         S62-151320 A   7/1987
(Continued)

OTHER PUBLICATIONS

Extended European Search Report dated Jul. 6, 2021 in Patent Application No. 18878092.8, 7 pages.
(Continued)

*Primary Examiner* — Edmund H Lee
(74) *Attorney, Agent, or Firm* — Element IP, PLC (57) ABSTRACT

Disclosed is a manufacturing method of a sheet molded article, including the steps of: thermoforming a molding sheet with a first mold, thereby molding a molded article including a body portion provided with a shape transferred from the first mold, and a peripheral edge portion surrounding the body portion; and removing the molded article from the first mold, and inverting the body portion front-to-back.

11 Claims, 8 Drawing Sheets

(56) References Cited

U.S. PATENT DOCUMENTS

| | | | | |
|---|---|---|---|---|
| 3,355,535 | A * | 11/1967 | Elias | A43D 8/06 |
| | | | | 264/321 |
| 3,411,186 | A * | 11/1968 | Huff | A43D 3/02 |
| | | | | 425/119 |
| 3,562,930 | A * | 2/1971 | Kaufman | B29D 35/08 |
| | | | | 36/102 |
| 3,641,603 | A * | 2/1972 | Lockwood | A43D 8/12 |
| | | | | 12/146 C |
| 3,676,542 | A * | 7/1972 | Maltby | B29D 35/06 |
| | | | | 264/244 |
| 3,720,971 | A * | 3/1973 | Wyness | B29D 35/0072 |
| | | | | 12/146 C |
| 6,086,801 | A | 7/2000 | Eaton | |
| 9,789,644 | B2 * | 10/2017 | Iovu | B32B 37/1018 |
| 9,894,960 | B2 * | 2/2018 | Cavaliere | B29C 51/06 |
| 2002/0132069 | A1 | 9/2002 | Kose et al. | |
| 2014/0196321 | A1 | 7/2014 | Wu et al. | |
| 2015/0305448 | A1 * | 10/2015 | Cavaliere | B29D 35/126 |
| | | | | 12/145 |
| 2015/0342296 | A1 * | 12/2015 | Skaja | A43B 23/026 |
| | | | | 36/83 |

FOREIGN PATENT DOCUMENTS

| | | |
|---|---|---|
| JP | S62248620 A | 10/1987 |
| JP | 6-31108 B2 | 4/1994 |
| JP | H06143399 | 5/1994 |
| JP | 2012020424 A | 2/2012 |
| JP | 2014136160 A | 7/2014 |
| KR | 19980083407 A | 12/1998 |
| WO | WO-1999022996 A1 | 5/1999 |

OTHER PUBLICATIONS

International Search Report dated Jan. 8. 2019 in PCT/JP2018/040842 with English translation.

* cited by examiner

SHEET MOLDING PRODUCTION METHOD

TECHNICAL FIELD

The present invention relates to a manufacturing method of a sheet molded article obtained by molding a molding sheet.

BACKGROUND ART

The upper materials of sports shoes are manufactured by cutting cloth into a plurality of parts, and thereafter sewing the parts together into a shape that fits the top of a foot. In recent years, for the purpose of reducing the production cost, reducing the environmental load, or improving the recyclability of products in a variety of fields, there is a need for the development of manufacturing methods of various products with a reduced number of parts.

For example, PTL 1 listed below relates to a manufacturing method of a breathable waterproof shoe, and discloses a manufacturing method of a breathable waterproof shoe, including the steps of: preparing a mold; immersing the mold into a rubber material and causing the rubber material to adhere to a surface of the mold; drying the rubber material on the surface of the mold, the rubber material being dried to be molded into a thin and integrally molded shoe body on the surface of the mold; combining an inside layer with the shoe body; reversing the inside layer and the shoe body and stripping the inside layer and the shoe body off from the mold at the same time; and combining a sole with a bottom of the shoe body. Also, PTL 1 discloses that with such a manufacturing method, a breathable waterproof shoe can be easily manufactured, and it is therefore possible to effectively reduce the manufacturing cost of shoes.

PTL 2 listed below discloses a manufacturing method of a waterproof hood formed by stacking an outer member made of a fiber structure and an inner waterproof film, the method including the steps of: three-dimensionally forming the outer member; placing the waterproof film in a mold having a recess; placing the outer member on the waterproof film; joining the waterproof film and the outer member using a protrusion member that can be fitted to the recess of the mold; and reversing a stack of the joined waterproof film and outer member such that the outer member is disposed on the outer side of the waterproof hood. Also, PTL 2 discloses that such a manufacturing method can realize the manufacturing of a waterproof hood without using sealing tape by joining (bonding) the outer member of the hood and the seamless waterproof film using the mold.

CITATION LIST

Patent Literatures

[PTL 1] Japanese Laid-Open Patent Publication No. 2014-136160
[PTL 2] Japanese Laid-Open Patent Publication No. 2012-020424

SUMMARY OF INVENTION

Technical Problem

Methods for manufacturing a sheet molded article by molding a molding sheet into a three-dimensional shape through vacuum-pressure molding, pressure molding, vacuum molding, hot-press molding or the like are known. Such a manufacturing method of a sheet molded article seems to be useful for simplification of the manufacturing process of the upper materials of sports shoes.

Figure 7A:
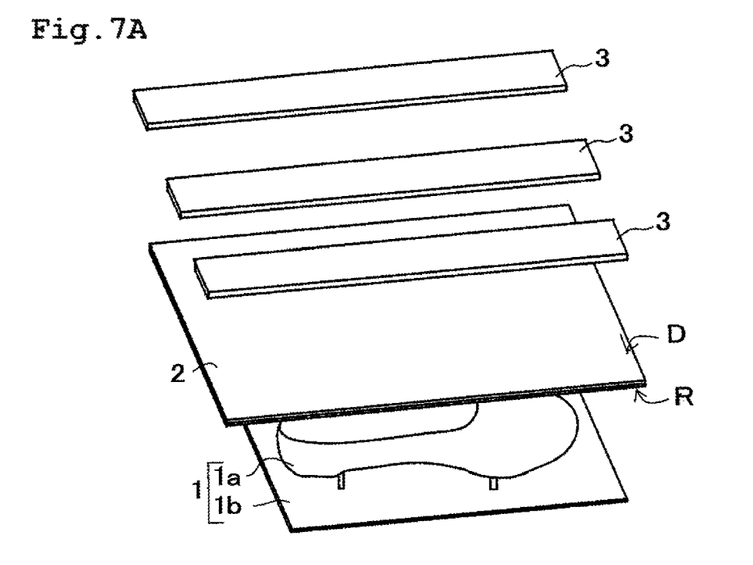
FIGS. 7A to 7C show explanatory diagrams illustrating the steps of a molding process in a manufacturing method of a sheet molded article for illustrating the problems to be solved by the present invention.
Figure 7B:
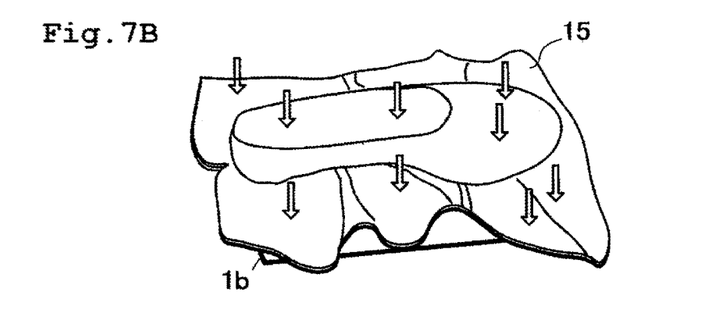
Figure 7C:
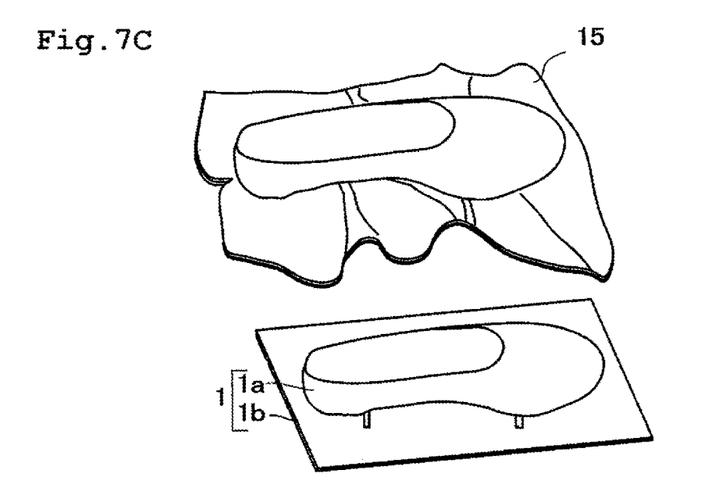

Referring to FIG. 7, a manufacturing method of a sheet molded article having a three-dimensional shape of a shoe by molding a molding sheet 2 serving as cloth in conformity with a mold 1a serving as a last mold having a shape of a shoe will be described. The molding sheet 2 includes a design surface D that will constitute the outer surface of the shoe upper and a non-design surface R that will constitute the inner surface of the shoe upper.

In the molding method shown in FIG. 7A to FIG. 7C, first, as shown in FIG. 7A, the molding sheet 2 is softened by being heated with heaters 3, and is thereafter disposed so as to cover the mold 1a. At this time, the molding sheet 2 is disposed such that the non-design surface R faces the mold 1a and the design surface D faces the heaters 3. Then, as shown in FIG. 7B, the softened molding sheet 2 is pressurized as indicted by the arrows, thus being deformed so as to come into close contact with the mold 1a.

Then, the molding sheet 2 that has been deformed so as to conform with the mold 1a is cooled, and is released from the mold 1a, whereby a sheet molded article 15 to which the shape of the shoe mold of the mold 1a has been transferred is obtained as shown in FIG. 7C.

Figure 8:
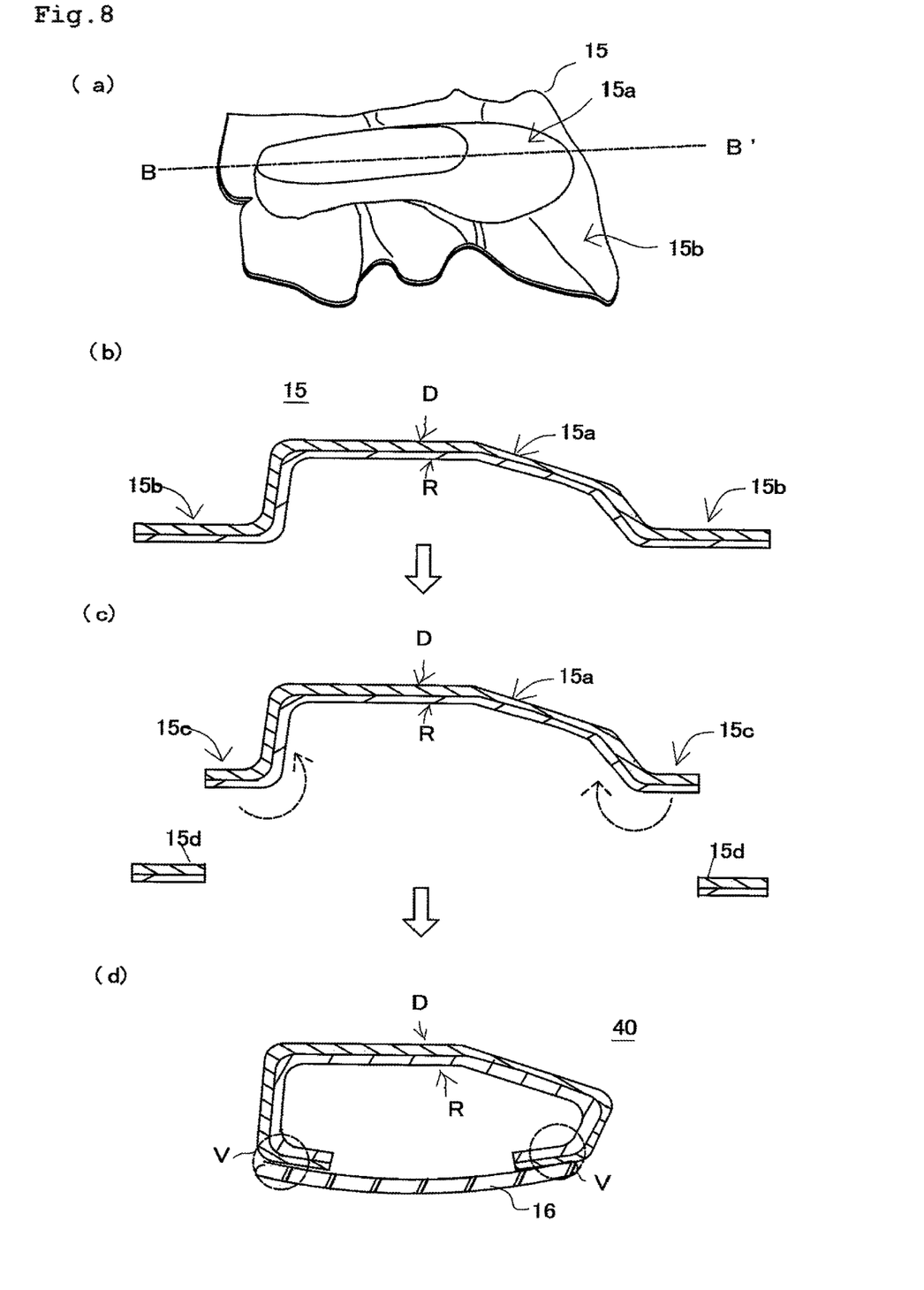
FIG. 8 shows explanatory diagrams illustrating the steps of an aftertreatment process in a manufacturing method of a sheet molded article for illustrating the problems to be solved by the present invention.

As shown in FIG. 8(a), the sheet molded article 15 obtained in the above-described manner includes a body portion 15a to which the shoe shape of the mold 1a has been transferred, and a peripheral edge portion 15b surrounding the body portion 15a. FIG. 8(b) is a schematic cross-sectional view of the sheet molded article 15 shown in FIG. 8(a), taken along the line B-B' in FIG. 8(a). As shown in FIG. 8(b), the sheet molded article 15 is molded such that the outer surface of the shoe shape will constitute the design surface D, and the inner surface thereof will constitute the non-design surface R. Then, as shown in FIG. 8(c), an unnecessary peripheral edge portion 15d is cut off from the peripheral edge portion 15b by trimming the sheet molded article 15 so as to conform with the shoe shape. Then, in order to form a wound portion v serving as a margin for attaching a shoe sole, a peripheral edge remaining portion 15c, which is the remaining portion of the peripheral edge portion 15b, is folded inward in the direction indicated by the dashed arrows. Note that the wound portion v is a portion that is shaped in a direction in which the molding sheet is wound so as to extend along the bottom surface of the mold when the molding sheet is three-dimensionally molded. The wound portion extending along the bottom surface of the mold is difficult to be shaped in the molding step because pressure is less likely to be applied to the bottom surface during molding.

Then, as shown in FIG. 8(d), by attaching a shoe sole 16 such as a rubber sole to the wound portion v, the body portion 15a and the shoe sole 16 are integrated with each other, whereby a shoe intermediate 40 having the shoe outer shape is completed.

In the case of manufacturing a sheet molded article by the above-described manufacturing method, the following problems have occurred in some cases. Specifically, the wound portion v that is bent in a direction extending along the bottom surface of the shoe as shown in FIG. 8(d) is difficult to be shaped in the molding step. Accordingly, the outwardly facing peripheral edge remaining portion 15c needs to be formed so as to be folded inward. However, the operation of folding the peripheral edge remaining portion 15c inward is troublesome, and moreover, it is difficult to perform the folding accurately. Additionally, the portion where the wound portion is formed is a portion where cloth is gathered, and therefore, creases tend to be generated in that portion. Furthermore, the design surface on the outer surface of the shoe shape may be roughened or hardened, so that the design quality and the texture of the design surface cannot be sufficiently maintained, resulting in a degraded external appearance.

It is an object of the present invention to solve the above-described problems, or in other words, to provide a manufacturing method of a sheet molded article for which it is required to form an inwardly facing shape (wound portion) at the peripheral edge thereof, wherein the manufacturing method enables the wound portion to be easily formed.

Solution to Problem

An aspect of the present invention is directed to a manufacturing method of a sheet molded article, including the steps of: thermoforming a molding sheet with a first mold, thereby molding a molded article including a body portion provided with a shape transferred from the first mold, and a peripheral edge portion surrounding the body portion; and removing the molded article from the first mold, and inverting the body portion front-to-back. With such a manufacturing method, the shape of a wound portion that is difficult to be formed in the molding step can be easily formed in the sheet molded article. By inverting the body portion front-to-back, the back side that had a small surface area constitutes the front side and is stretched, whereby a sheet molded article for which the generation of creases is suppressed can be obtained.

It is preferable that the above-described manufacturing method further includes the step of attaching, to a second mold, the body portion that has been inverted front-to-back, and heat-treating the sheet molded article, because the shaping of the wound portion can be more easily performed by heat-setting the sheet molded article into a shape conforming with the second mold. At this time, it is preferable that the first mold has a shape inverted from a shape of the second mold: Specifically, it is preferable that, for example, if the second mold includes a recessed portion, the first mold includes a protruding portion at the portion corresponding thereto, and if the second mold has a shape configured to cause the peripheral edge portion of the sheet molded article to face inward, the first mold has a shape configured to mold a sheet molded article having an outwardly expanding peripheral edge portion. In the case where the first mold has a shape inverted from the shape of the second mold in this manner, the shape of the sheet molded article molded with the first mold can be more clearly formed by attaching the body portion that has been inverted front-to-back to the second mold, and heat-treating the sheet molded article.

It is preferable that the molding sheet includes a design surface and a non-design surface, and a surface thereof in contact with the first mold is the design surface, and a surface thereof not in contact with the first mold is the non-design surface, because the heat and the pressure applied to the design surface in order to soften the molding sheet can be reduced by contact with the first mold, thus making it possible to suppress the degradation of the external appearance of the design surface. Here, a design surface means a surface that constitutes the outer surface of a final product, and a non-design surface means a surface that constitutes the inner surface of the final product. In this case, it is particularly preferable that the molding sheet is heated with a heater disposed so as to face the non-design surface.

This is preferable because as a result of the heater for heating the molding sheet being disposed so as to face the non-design surface, the heat from the heater will not be directly applied to the design surface, thus making it possible to further suppress the degradation of the external appearance of the design surface. Examples of the molding sheet having the design surface and the non-design surface include a leather-like sheet having a design surface including a resin layer or a napped surface.

As the thermoforming, it is possible to use, for example, a sheet molding method such as vacuum-pressure molding, vacuum molding, and hot-press molding.

Advantageous Effects of Invention

With the manufacturing method of a sheet molded article according to the present invention, in the manufacture of a sheet molded article for which it is required to form an inwardly facing shape (wound portion) at a peripheral edge, it is possible to easily shape the wound portion.

DESCRIPTION OF EMBODIMENT

Figure 1A:
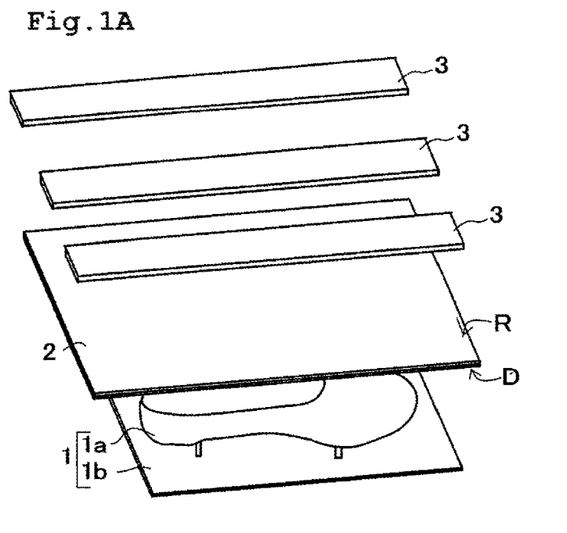
FIGS. 1A to 1C show explanatory diagrams illustrating the steps of a molding process in a manufacturing method of a sheet molded article according to the present embodiment.
Figure 1B:
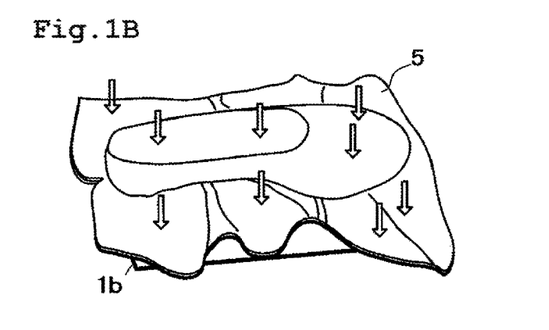
Figure 1C:
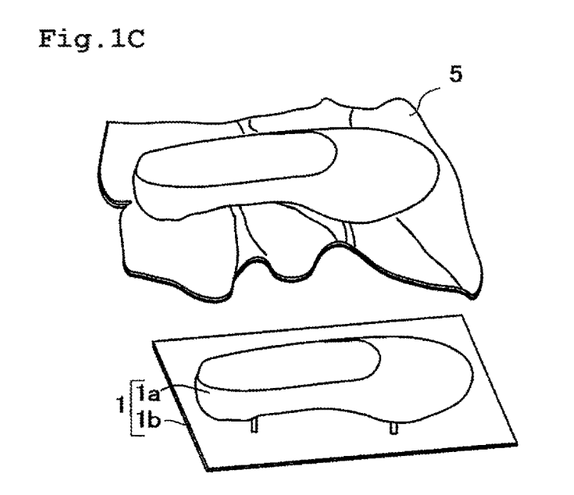

The manufacturing method of a sheet molded article according to the present embodiment will be described with reference to FIGS. 1A to 1C. FIGS. 1A to 1C show explanatory diagrams illustrating the steps of thermoforming using a shoe-shaped mold (last mold) by pressure molding, as an example of the molding process using the manufacturing method of a sheet molded article according to the present embodiment.

In FIGS. 1A to 1C, numeral 1 denotes a metal mold including a mold (last mold) 1a having the shape of a left shoe, and the mold 1a is supported by a pedestal 1b. Numeral 2 denotes a molding sheet, which includes a design surface D that will later constitute the outer surface of the shoe, and a non-design surface R that will later constitute the inner surface of the shoe. The present embodiment shows an example using, as the molding sheet 2, a leather-like sheet, which is an artificial leather, having a surface of a grain-finished resin layer with a design quality as the design surface D, and a surface of an artificial leather base material provided with no design as the non-design surface R. The molding sheet 2 has a size that completely covers the mold 1a. Numeral 3 denotes a heater provided in a molding machine in order to heat the molding sheet 2. Numeral 5 denotes a sheet molded article formed by thermoforming the molding sheet 2. Although the above-described example shows an example in which molding is performed using pressure molding, the molding method is not limited to pressure molding. Any preferable molding method such as vacuum molding, pressure molding, vacuum-pressure molding, and hot-press molding may be selected as necessary as long as the method softens a molding sheet by heating, and thereafter molding the molding sheet into a three-dimensional shape so as to bring the molding sheet into close contact with the mold.

In the thermoforming of the present embodiment, first, as shown in FIG. 1A, the molding sheet 2 that has been softened by being heated with the heaters 3 is disposed so as to cover the mold 1a. As the mold, for example, a mold having a wound shape on the bottom surface thereof, such as a wooden mold of a shoe, is preferable because the effects of the present invention become prominent. Although the material of the mold is not particularly limited, it is possible to use a metal mold, a wooden mold, a resin mold and the like without any particular limitation.

In the case where the molding sheet 2 is softened by being heated using the heaters 3 as shown in FIG. 1A, it is preferable that the molding sheet 2 is disposed such that the non-design surface R faces the heaters 3, and the design surface D does not face the heaters 3. By doing so, the design surface D will not be directly heated, and therefore, the degradation of the texture due to an excessive heat applied to the design surface can be suppressed.

Then, as shown in FIG. 1B, the softened molding sheet 2 is brought into close contact with the mold 1a while being pressed by atmospheric pressure as indicted by the arrows. Thus, the molding sheet 2 comes into close contact with the mold 1a, and is molded into the shape of a shoe to which the shape of the mold 1a has been transferred. Then, after the shape of the mold has been transferred, the molding sheet 2 is cooled, whereby the sheet molded article 5 to which the shoe shape has been transferred and set is formed.

Then, as shown in FIG. 1C, the sheet molded article 5 is released from the mold 1a, whereby the sheet molded article 5 to which the shoe shape of the mold 1a has been transferred is obtained.

Figure 2:
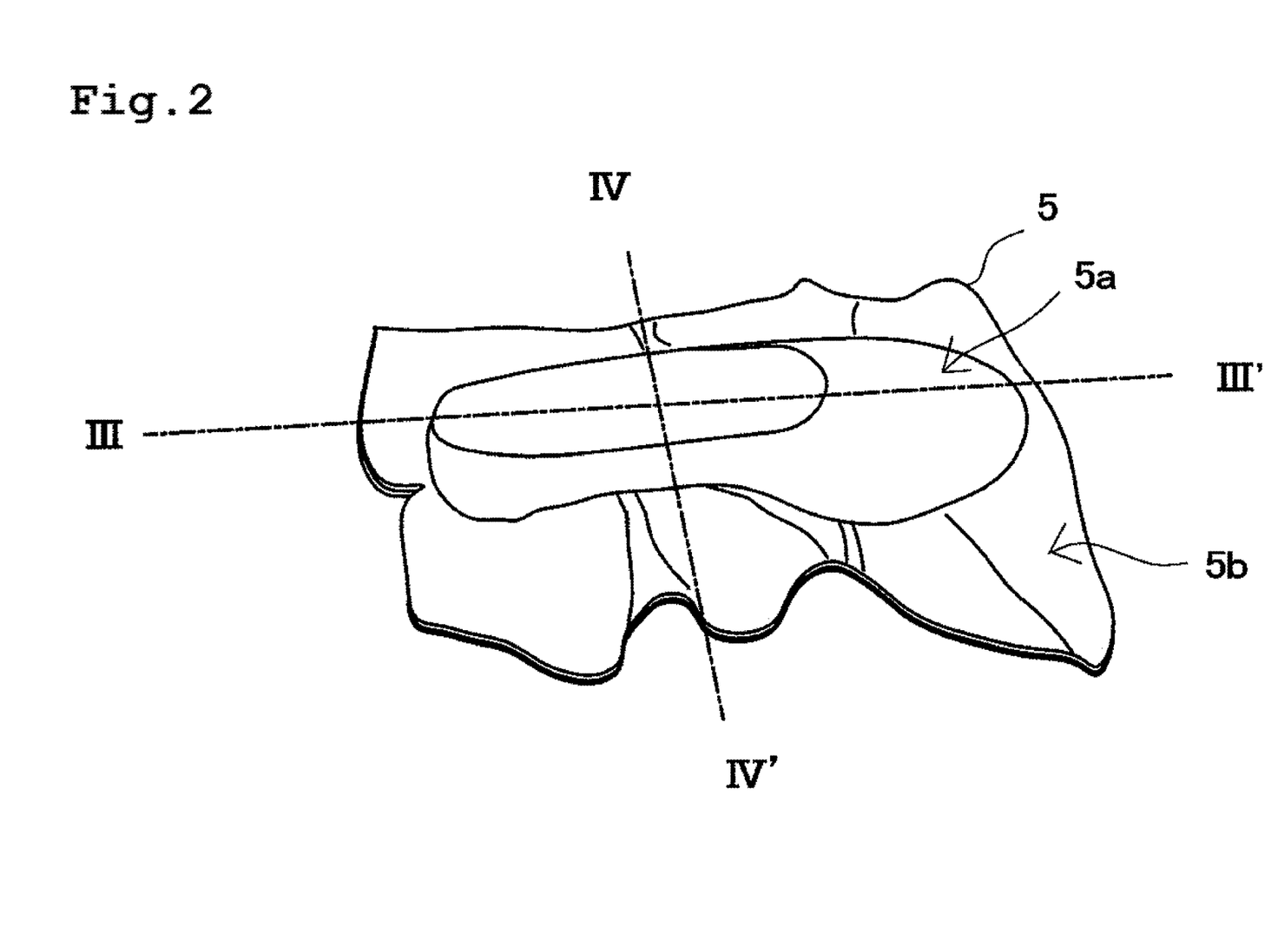
FIG. 2 is an explanatory diagram of the sheet molded article 5 shown in FIG. 1C.
Figure 3:
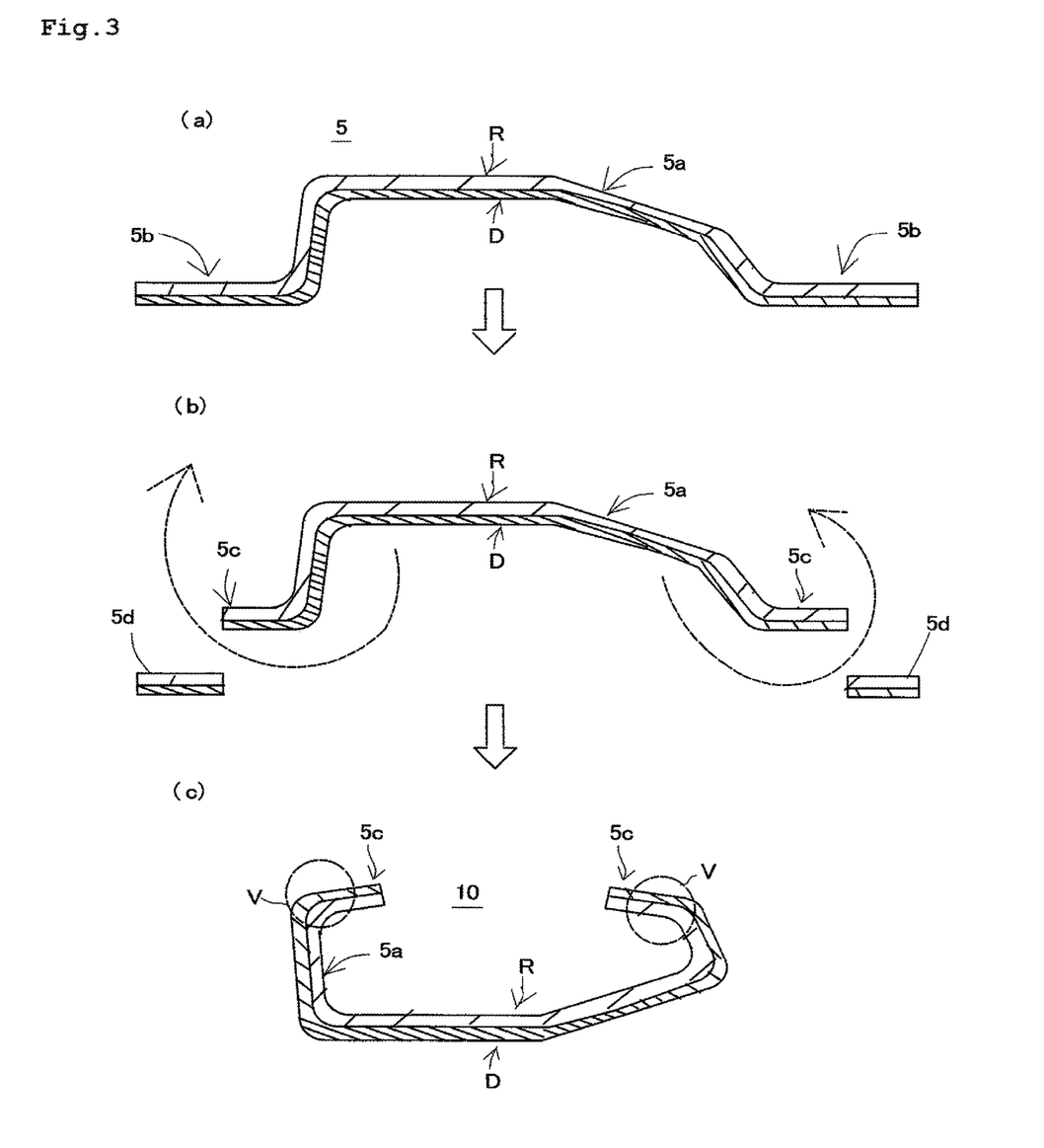
FIG. 3 shows explanatory diagrams illustrating the steps of an aftertreatment process of the sheet molded article 5, as viewed from the direction of a cross section taken along the line in FIG. 2.
Figure 4:
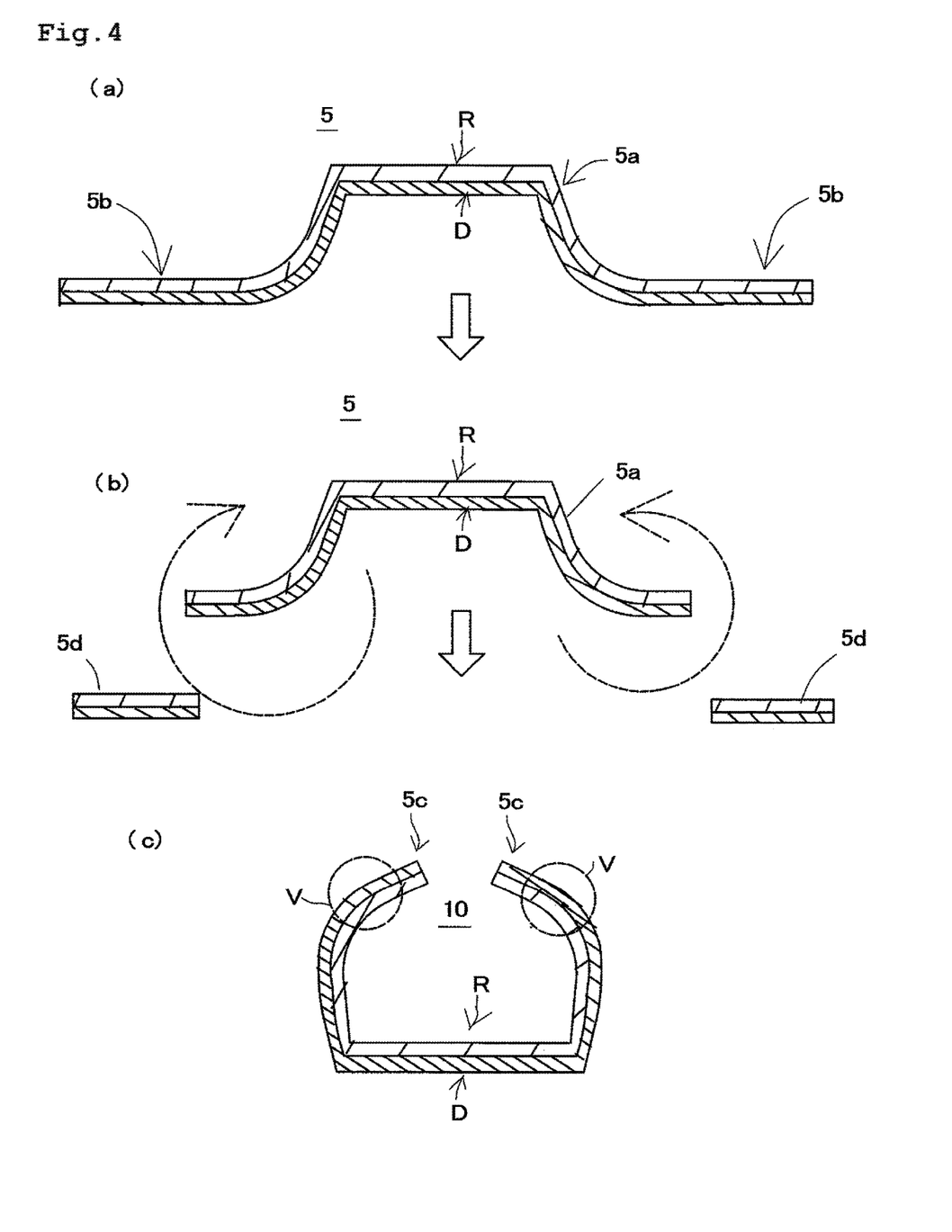
FIG. 4 shows explanatory diagrams illustrating the steps of an aftertreatment process of the sheet molded article 5, as viewed in the direction of a cross section taken along the line IV-IV' in FIG. 2.
Figure 5:
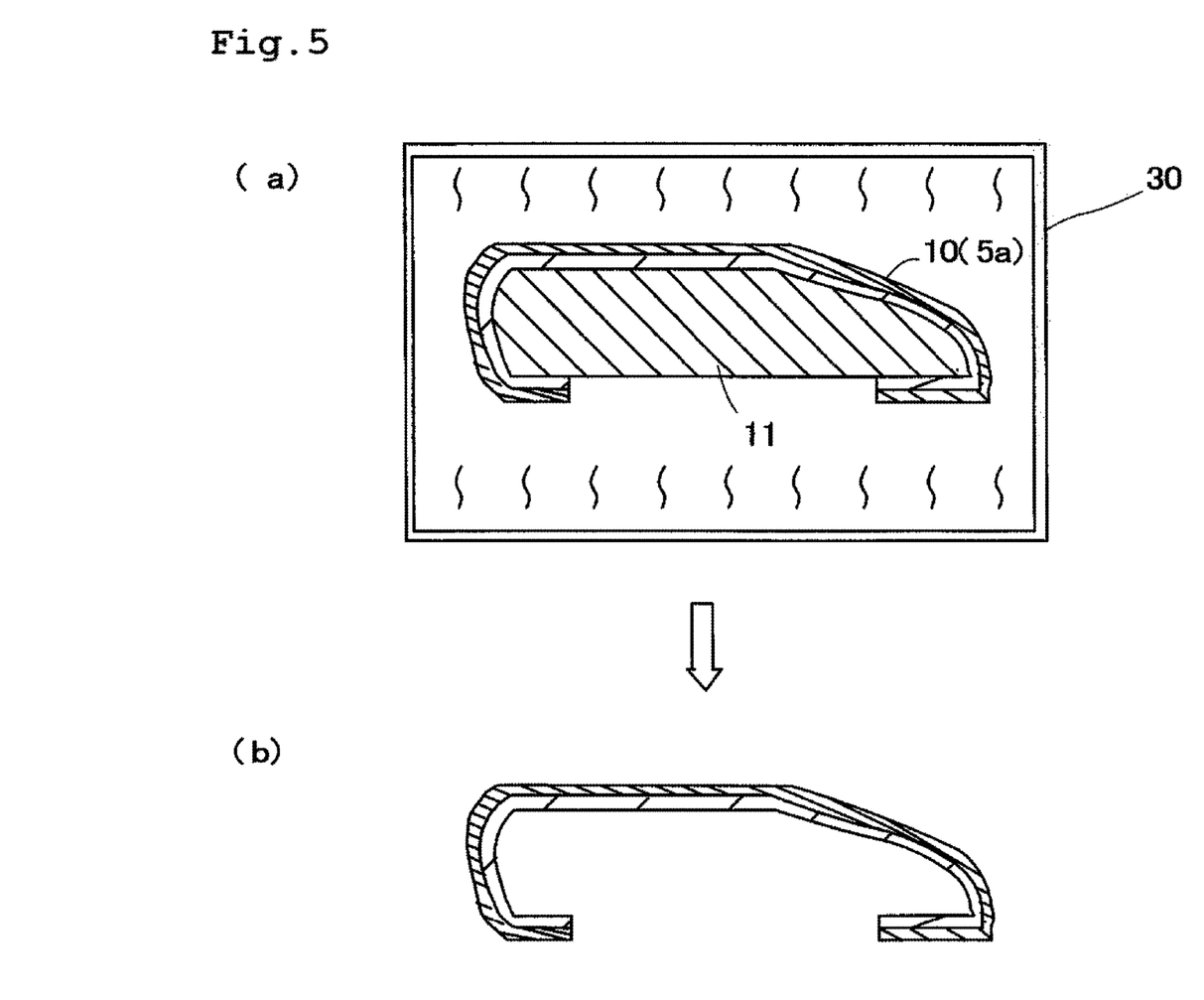
FIG. 5 shows explanatory diagrams illustrating a heat-treating process using a second mold in a manufacturing method of a sheet molded article according to the present embodiment.
Figure 6:
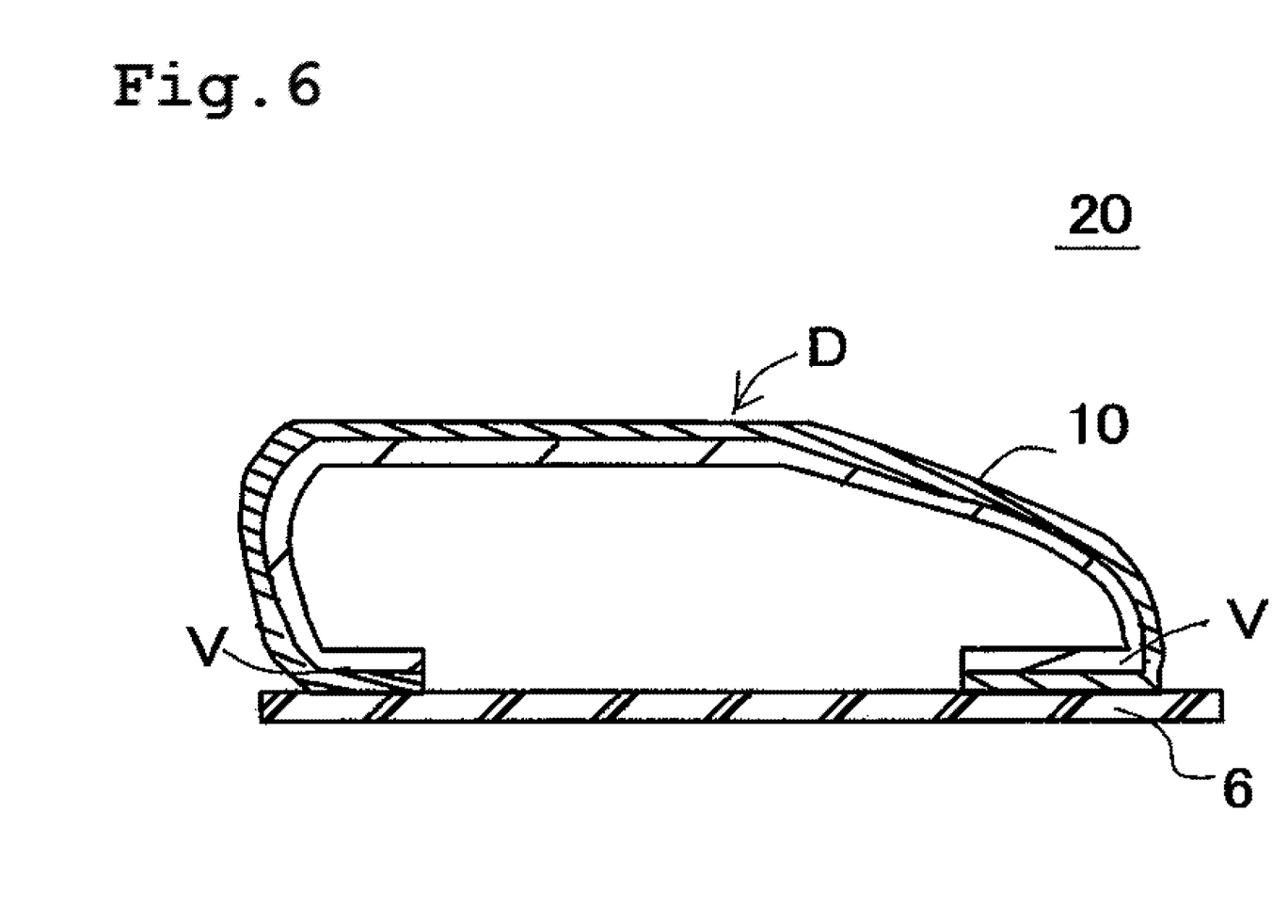
FIG. 6 is a schematic cross-sectional view showing a shoe intermediate 20 having a shoe outer shape, obtained by the manufacturing method of a sheet molded article according to the present embodiment.

Next, the aftertreatment of the sheet molded article 5 will be described with reference to FIGS. 2 to 6. FIG. 2 is an explanatory diagram of the sheet molded article 5 obtained according to FIG. 1. FIG. 3 shows schematic cross-sectional views illustrating the steps of the aftertreatment process of the sheet molded article 5, as viewed from the direction of a cross section taken along the line III-III' in FIG. 2. FIG. 4 shows schematic cross-sectional views illustrating the steps of the aftertreatment process of the sheet molded article 5, as viewed in the direction of a cross section taken along the line IV-IV' in FIG. 2. FIG. 5 shows explanatory diagrams illustrating the step of attaching, to another mold 11, a body portion 5a that has been inverted front-to-back, and heat-treating the sheet molded article, the step being performed as necessary in order to more clearly form the sheet molded article into the desired shape. FIG. 6 is a schematic cross-sectional view showing a shoe intermediate 20 having a shoe outer shape, obtained by attaching a shoe sole 6 to the body portion 5a that has been inverted front-to-back.

As shown in FIG. 2, the sheet molded article 5 obtained in the above-described manner is a sheet molded article including a body portion 5a to which the shape of the mold 1a has been transferred, and a peripheral edge portion 5b surrounding the body portion 5a.

As shown in FIGS. 3(a) and 4(a), the sheet molded article 5 has been molded such that the outer surface of the shoe shape constitutes the non-design surface R, and the inner surface thereof constitutes the design surface D. As shown in FIGS. 3(a) and 4(a), in the aftertreatment of the sheet molded article 5, an unnecessary peripheral edge portion 5d is cut off from the peripheral edge portion 5b by trimming the sheet molded article 5 so as to conform with the shoe shape. A peripheral edge remaining portion 5c that is left as a result of cutting off the unnecessary peripheral edge portion 5d from the peripheral edge portion 5b expands outward. Then, as indicated by the dashed arrows in FIGS. 3(b) and 4(b), the body portion 5a of the sheet molded article 5 is inverted front-to-back. In this manner, a sheet molded article 10 in which the body portion 5a of the sheet molded article 5 has been inverted front-to-back is obtained.

As shown in FIGS. 3 (c) and 4 (c), in the sheet molded article 10 obtained by performing the treatment to invert the body portion 5a of the sheet molded article 5 front-to-back, the peripheral edge remaining portion 5c that expanded outward faces inward. In addition, the design surface D that constituted the inner surface of the shoe shape constitutes the outer surface, and the non-design surface R that constituted the outer surface constitutes the inner surface thereof. In this manner, by causing the peripheral edge remaining portion 5c to face inward by inverting the body portion 5a of the sheet molded article 5 front-to-back, the sheet molded article 10 including the wound portion v can be obtained.

If necessary, it is preferable that, as shown in FIG. 5, the sheet molded article 10 that has been inverted front-to-back is subjected to a treatment to attach the body portion 5a to a mold 11 (second mold) conforming with the shape of the body portion 5a that has been inverted front-to-back, and then to heat the sheet molded article 10 in a heating furnace 30 to adjust the shape of the mold 11. By being subjected to heat-treating in this manner, the body portion 5a that has been inverted front-to-back can be more accurately shaped so as to conform with the shape of the mold 11. Note that it is preferable that the first mold and the second mold have shapes that are inverted from each other: Specifically, it is preferable that, for example, if the second mold includes a recessed portion, the first mold includes a protruding portion at the portion corresponding thereto, and if the second mold has a shape configured to cause the peripheral edge portion of the sheet molded article to face inward, the first mold has a shape configured to mold a sheet molded article having an outwardly expanding peripheral edge portion. In the case of the present embodiment, the body portion 5a that has been molded with the mold 1a having the shape of the left foot side of a shoe will have the shape of a right shoe by being inverted front-to-back. Accordingly, the shape of the mold 11 conforming with the shape of the body portion 5a that has been inverted front-to-back has the shape of the right shoe, which is symmetrical with the shape of the mold 1a. In the case where the first mold has a shape inverted from the shape of the second mold in this manner, the shape of the sheet molded article molded with the first mold can be more clearly formed by attaching the body portion that has been inverted front-to-back to the second mold and heat-treating the sheet molded article.

Then, as shown in FIG. 6, by attaching the shoe sole 6 such as a rubber sole to the sheet molded article 10 using, as the attachment margin, the inwardly facing peripheral edge remaining portion 5c, which is the wound portion v of the sheet molded article 10, a shoe intermediate 40 having the shoe outer shape is obtained. At this time, as shown in FIGS. 3(c) and 4(c), the peripheral edge remaining portion 5c that expanded outward faces inside of the shoe shape to form the wound portion v. Accordingly, the wound portion v can be easily used as the attachment margin.

With the above-described manufacturing method of a sheet molded article, it is possible to easily manufacture a sheet molded article, such as a shoe upper material, that is required to include a wound portion. As the molding sheet for use in the manufacturing method of a sheet molded article, it is possible to use sheets that are used in a molding method in which a molding sheet is softened by being heated, and is thereafter molded into a three-dimensional shape so as to come into close contact with a mold, such as vacuum molding, pressure molding, vacuum-pressure molding, or hot-press molding: Specifically, it is possible to use a single-layer resin sheet, a resin sheet including a design layer such as a print layer or an embossed layer, a fabric such as a non-woven fabric or a woven fabric, or a leather-like sheet such as an artificial leather or a synthetic leather in which a resin layer or a napped surface is provided on the surface of a fiber base material obtained by impregnating a fabric with an elastic polymer such as polyurethane.

In the present embodiment, the manufacture of a shoe upper material is described as an example. However, the manufacturing method of the present embodiment is not limited to the manufacture of a shoe upper material, and can be applied, without any particular limitation, to the manufacture of molded articles such as surface decorations of a case of a portable terminal, an electronic product, and a large vehicle interior material (dashboard, etc.), and also a molded article, such as a vehicle seat cover, that has been conventionally obtained by sewing a combination of a plurality of parts together in order to achieve a wound shape, and for which the process can be advantageously shortened by achieving the molded article by a single molding process.

REFERENCE SIGNS LIST

1 . . . Metal mold
1a . . . Mold (first mold)
1b . . . Pedestal
2 . . . Molding sheet
3 . . . Heater
5 . . . Sheet molded article
5a . . . Body portion
5b . . . Peripheral edge portion
5c, 15c . . . Peripheral edge remaining portion
5b, 15d . . . Unnecessary peripheral edge portion
6 . . . Shoe sole
11 . . . Mold (second mold)
15 . . . Sheet molded article
15a . . . Body portion
15b . . . Peripheral edge portion
16 . . . Shoe sole
20, 40 . . . Shoe intermediate
30 . . . Heating furnace
D . . . Design surface
R . . . Non-design surface
V . . . Wound portion

The invention claimed is:

1. A method of manufacturing a sheet molded article, comprising:
thermoforming a molding sheet with a first mold, thereby molding a molded article including a body portion provided with a shape transferred from the first mold, and a peripheral edge portion surrounding the body portion;
removing the molded article from the first mold;
cutting off an unnecessary peripheral edge portion from the peripheral edge portion, to obtain a peripheral edge remaining portion comprising a cut edge; and
inverting the body portion front-to-back so that the cut edge faces inward.

2. The method according to claim 1, further comprising attaching, to a second mold, the body portion that has been inverted front-to-back, and heat-treating the body portion.

3. The method according to claim 2,
wherein the first mold has a shape inverted from a shape of the second mold.

4. The method according to claim 1,
wherein the molding sheet has a design surface and a non-design surface, and
a surface thereof in contact with the first mold is the design surface, and a surface thereof not in contact with the first mold is the non-design surface.

5. The method according to claim 4, wherein,
in the thermoforming, the molding sheet is heated with a heater disposed so as to face the non-design surface.

6. The method according to claim 4,
wherein the molding sheet is a fabric, or an artificial or synthetic leather sheet including a fiber base material obtained by impregnating a fabric with an elastic polymer, and has, on one surface of the fiber base material, the design surface that is a resin layer or a napped surface.

7. The method according to claim 1,
wherein the thermoforming is vacuum-pressure molding, vacuum molding, or hot-press molding.

8. The method according to claim 1,
wherein the body portion has a shape of a shoe upper.

9. A method of manufacturing a sheet molded article, comprising:
thermoforming a molding sheet with a first mold, thereby molding a molded article including a body portion provided with a shape transferred from the first mold, and a peripheral edge portion surrounding the body portion;
removing the molded article from the first mold;
cutting off an unnecessary peripheral edge portion from the peripheral edge portion, to obtain a peripheral edge remaining portion comprising a cut edge;
inverting the body portion front-to-back so that the cut edge faces inward; and
attaching, to a second mold, the body portion that has been inverted front-to-back, and heat-treating the body portion;
wherein the molding sheet has a design surface and a non-design surface, and
a surface thereof in contact with the first mold is the design surface, and a surface thereof not in contact with the first mold is the non-design surface.

10. The method according to claim 9, wherein,
in the thermoforming, the molding sheet is heated with a heater disposed so as to face the non-design surface.

11. The method according to claim 10,
wherein the molding sheet is a fabric, or an artificial or synthetic leather sheet including a fiber base material obtained by impregnating a fabric with an elastic polymer, and has, on one surface of the fiber base material, the design surface that is a resin layer or a napped surface.

\* \* \* \* \*